United States Patent
Araújo et al.

(10) Patent No.: US 12,315,193 B2
(45) Date of Patent: May 27, 2025

(54) LOCALIZATION AND MAPPING BY A GROUP OF MOBILE COMMUNICATIONS DEVICES

(71) Applicant: Telefonaktiebolaget LM Ericsson (publ), Stockholm (SE)

(72) Inventors: José Araújo, Stockholm (SE); Volodya Grancharov, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 421 days.

(21) Appl. No.: 17/909,504

(22) PCT Filed: Mar. 27, 2020

(86) PCT No.: PCT/EP2020/058797
§ 371 (c)(1),
(2) Date: Sep. 6, 2022

(87) PCT Pub. No.: WO2021/190767
PCT Pub. Date: Sep. 30, 2021

(65) Prior Publication Data
US 2023/0112456 A1     Apr. 13, 2023

(51) Int. Cl.
*G06T 7/73* (2017.01)
*G06T 3/18* (2024.01)
*G06T 3/20* (2006.01)

(52) U.S. Cl.
CPC ............... *G06T 7/74* (2017.01); *G06T 3/18* (2024.01); *G06T 3/20* (2013.01); *G06T 2207/10028* (2013.01); *G06T 2207/30232* (2013.01)

(58) Field of Classification Search
CPC .... G06T 7/74; G06T 3/18; G06T 3/20; G06T 2207/10028; G06T 2207/30232;
(Continued)

(56) References Cited

U.S. PATENT DOCUMENTS

| 8,351,656 B2 * | 1/2013 | Spicola ................ G06T 7/62 382/110 |
| 11,544,167 B2 * | 1/2023 | Manivasagam .......... G06N 3/08 |

(Continued)

FOREIGN PATENT DOCUMENTS

AU       2019256021 A1 * 10/2020  ............. G06T 15/00

OTHER PUBLICATIONS

P. Speciale, J. L. Schönberger, S. B. Kang, S. N. Sinha and M. Pollefeys, "Privacy Preserving Image-Based Localization," 2019 IEEE/CVF Conference on Computer Vision and Pattern Recognition (CVPR), Long Beach, CA, USA, 2019, pp. 5488-5498, doi: 10.1109/CVPR.2019.00564. (Year: 2019).*

(Continued)

*Primary Examiner* — Stephen R Koziol
*Assistant Examiner* — Michael Kim Maiden
(74) *Attorney, Agent, or Firm* — Sage Patent Group (57) ABSTRACT

A mobile communications device for performing localization and mapping is disclosed, comprising a sensor operative to capture sensor data of its local environment, and operative to derive point-cloud data from the sensor data, which represents structural features of the local environment, determine a pose of the mobile communications device relative to a point-cloud map representing the local environment, derive a concealed representation of the point-cloud data, by applying a current linear transformation to the point-cloud data, and transmit the concealed representation of the point-cloud data to a map server. The current linear transformation is a shared secret, or is derivable from a shared secret, which shared secret is available to a group of mobile communications devices comprising the mobile communications device. Also disclosed are the map sever and a trusted server.

20 Claims, 5 Drawing Sheets

(58) Field of Classification Search
CPC .. G06T 2207/30244; G06T 7/73; H04W 4/38; H04W 4/44; H04W 12/033; H04W 12/63; H04W 12/02
See application file for complete search history.

(56) References Cited

U.S. PATENT DOCUMENTS

2014/0267234 A1    9/2014  Hook et al.
2020/0005486 A1*   1/2020  Sinha ................ G06T 7/337

OTHER PUBLICATIONS

A. Jolfaei, X.-W. Wu and V. Muthukkumarasamy, "A 3D Object Encryption Scheme Which Maintains Dimensional and Spatial Stability," in IEEE Transactions on Information Forensics and Security, vol. 10, No. 2, pp. 409-422, Feb. 2015, doi: 10.1109/TIFS.2014.2378146. (Year: 2015).*

Jolfaei, A., Xin-Wen Wu, & Muthukkumarasamy, V. (2015). A 3D Object Encryption Scheme Which Maintains Dimensional and Spatial Stability. IEEE Transactions on Information Forensics and Security, 10(2), 409-422. https://doi.org/10.1109/TIFS.20142378146 (Year: 2015).*

Speciale, P., Schonberger, J. L., Kang, S. B., Sinha, S. N., & Pollefeys, M. (2019). Privacy Preserving Image-Based Localization. 2019 IEEE/CVF Conference on Computer Vision and Pattern Recognition (CVPR), 5488-5498. https://doi.org/10.1109/CVPR.201900564 (Year: 2019).*

International Search Report and Written Opinion of the International Searching Authority for PCT International Application No. PCT/EP2020/058797 dated Nov. 24, 2020.

Speciale et al., "Privacy Preserving Image-Based Localization," 2019 IEEE/CVF Conference on Computer Vision and Pattern Recognition (CVPR), Jun. 15, 2019, pp. 5488-5498.

Jolfaei et al., "A 3D Object Encryption Scheme Which Maintains Dimensional and Spatial Stability," IEEE Transactions on Information Forensics and Security, vol. 10, No. 2, Feb. 2015, pp. 409-422.

Jin et al., "3D Point Cloud Encryption through Chaotic Mapping," PCM 2016: 17th Pacific-Rim Conference on Advances in Multimedia Information Processing—vol. 9916, Sep. 2016, pp. 119-129.

* cited by examiner

LOCALIZATION AND MAPPING BY A GROUP OF MOBILE COMMUNICATIONS DEVICES

CROSS REFERENCE TO RELATED APPLICATION

This application is a 35 U.S.C. § 371 national stage application of PCT International Application No. PCT/EP2020/058797 filed on Mar. 27, 2020, the disclosure and content of which is incorporated by reference herein in its entirety.

TECHNICAL FIELD

The invention relates to a mobile communications device for performing localization and mapping, a map server for supporting localization and mapping by a group of mobile communications devices, a trusted server for supporting localization and mapping by a group of mobile communications devices, a method for performing localization and mapping, performed by a mobile communications device, a method for supporting localization and mapping by a group of mobile communications devices, performed by a map server, a method for supporting localization and mapping by a group of mobile communications devices, performed by a trusted server, corresponding computer programs, corresponding computer-readable storage media, and corresponding data carrier signals.

BACKGROUND

There is a growing interest in utilizing information which represents the structure of real-world scenes surrounding mobile communications devices, given the wider availability of sensors for capturing data representing the devices' local environment, such as monocular cameras, stereo depth cameras, LiDAR sensors, and the like, and algorithms based on which structural information can be derived. For example, this may be used for constructing maps, 3D models, or digital twins, of an environment and using such information for performing precise localization of mobile communications devices indoors and outdoors. This is essential to applications such as autonomous driving and Augmented/Mixed Reality (AR/MR). Maps which are constructed based on captured sensor data are typically stored as point clouds. A point cloud is a set of points in (three-dimensional, 3D) space, where each point comprises coordinates of the point in 3D space. Frequently, point clouds comprise key points and/or descriptors which are extracted from visual sensor data. A known class of algorithms which is commonly used for localization of mobile communications devices is referred to as SLAM (Simultaneous Localization And Mapping). In navigation, robotic mapping, odometry for Virtual Reality (VR) or AR/MR, and similar applications, SLAM is the computational problem of constructing or updating a map of an environment while simultaneously keeping track of the location of an agent moving through the environment, such as a mobile communications device which is equipped with sensors based on which structural information of the environment can be derived and stored in a point cloud.

The sensor data which is used for updating a map of an environment can be captured by multiple mobile communications devices, at possibly different time instances, which has driven the interest in merging structural information, such as point clouds which are derived based on sensor data captured by different mobile communications devices, in the edge or cloud, where it can be made available for other mobile communications devices. This is also referred to as collaborative mapping.

However, since the captured data represents local environments of mobile communications devices, including objects, measures, sizes of spaces, and so forth, there is a privacy concern in merging structural information derived from sensor data, which is collected from multiple mobile communications devices, into a collaborative map repository which is stored in in the edge or the cloud. This is the case since such a map can potentially be used by third parties for analytics, object recognition, and targeted advertising. For instance, the provider of the edge or cloud storage service may perform analytics and object recognition on the map. The privacy of collaborative mapping has been considered one of the most important problems to be solved in AR/MR applications.

Encryption of 3D point-cloud information has been proposed in "3D Point Cloud Encryption Through Chaotic Mapping", by Xin Jin, Zhaoxing Wu, Chenggen Song, Chunwei Zhang, and Xiaodong Li, in PCM 2016: 17th Pacific-Rim Conference on Advances in Multimedia Information Processing, Volume 9916, pages 119-129, https://doi.org/10.1007/978-3-319-48890-5_12, ACM, 2016). Encryption successfully protects the privacy of the visual real-world scene but hinders merging of point clouds derived by sensor data obtained from different mobile communications devices. Accordingly, it prevents a continuous update of the point cloud by collaborative mapping.

Another proposed solution converts 3D points into 3D lines in order to keep the 3D point information private ("Privacy Preserving Image-Based Localization", by Pablo Speciale, Johannes L. Schönberger, Sing Bing Kang, Sudipta N. Sinha, and Marc Pollefeys, arXiv:1903.05572, 2019). However, a node receiving 3D lines from multiple mobile communications devices will eventually recover the original point cloud with a good certainty, if enough lines are received.

SUMMARY

It is an object of the invention to provide an improved alternative to the above techniques and prior art.

More specifically, it is an object of the invention to provide improved solutions for preserving the privacy of structural information in collaborative mapping.

These and other objects of the invention are achieved by means of different aspects of the invention, as defined by the independent claims. Embodiments of the invention are characterized by the dependent claims.

According to a first aspect of the invention, a mobile communications device for performing localization and mapping is provided. The mobile communications device comprises at least one sensor which is operative to capture sensor data of a local environment of the mobile communications device. The mobile communications device further comprises processing circuitry which causes the mobile communications device to be operative to derive point-cloud data from the sensor data. The derived point-cloud data represents structural features of the local environment. The mobile communications device is further operative to determine a pose of the mobile communications device relative to a point-cloud map representing the local environment, and to derive a concealed representation of the point-cloud data. The concealed representation of the point-cloud data is derived by applying a current linear transformation to the point-cloud data. The mobile communications device is further operative to transmit the concealed representation of the point-cloud data to a map server. The current linear transformation is a shared secret, or is derivable from a shared secret. The shared secret is available to a group of mobile communications devices comprising the mobile communications device.

According to a second aspect of the invention, a map server for supporting localization and mapping by a group of mobile communications devices is provided. The map server comprises processing circuitry which cause the map server to be operative to receive concealed representations of point-cloud data from one or more mobile communications devices of the group of mobile communications devices. The map server is further operative to merge the received concealed representations of point-cloud data with a current concealed representation of a point-cloud map representing local environments of the one or more mobile communications devices. The concealed representations of point-cloud data and the current concealed representation of a point-cloud map are derivable by applying a current linear transformation to the point-cloud data and the point-cloud map, respectively. The current linear transformation is a shared secret, or is derivable from a shared secret. The shared secret is available to the group of mobile communications devices.

According to a third aspect of the invention, a trusted server for supporting localization and mapping by a group of mobile communications devices is provided. The trusted server comprises processing circuitry which causes the trusted server to be operative to receive a current concealed representation of a point-cloud map from the map server, and to derive a subsequent concealed representation of the point-cloud map. The derived subsequent concealed representation is different from the current concealed representation. The trusted server is further operative to transmit the subsequent concealed representation of the point-cloud map to the map server. The current concealed representation of the point-cloud map is derivable by applying a current linear transformation to the point-cloud map. The current linear transformation is a shared secret, or is derivable from a shared secret. The shared secret is available to the group of mobile communications devices.

According to a fourth aspect of the invention, a method for performing localization and mapping is provided. The method is performed by a mobile communications device and comprises capturing sensor data of a local environment of the mobile communications device, using at least one sensor comprised in the mobile communications device. The method further comprises deriving point-cloud data from the sensor data. The derived point-cloud data represents structural features of the local environment. The method further comprises determining a pose of the mobile communications device relative to a point-cloud map representing the local environment, and deriving a concealed representation of the point-cloud data. The concealed representation of the point-cloud data is derived by applying a current linear transformation to the point-cloud data. The method further comprises transmitting the concealed representation of the point-cloud data to a map server. The current linear transformation is a shared secret, or is derivable from a shared secret. The shared secret is available to a group of mobile communications devices comprising the mobile communications device.

According to a fifth aspect of the invention, a method for supporting localization and mapping by a group of mobile communications devices is provided. The method is performed by a map server and comprises receiving concealed representations of point-cloud data from one or more mobile communications devices of the group of mobile communications devices. The method further comprises merging the received concealed representations of point-cloud data with a current concealed representation of a point-cloud map representing local environments of the one or more mobile communications devices. The concealed representations of point-cloud data and the current concealed representation of a point-cloud map are derivable by applying a current linear transformation to the point-cloud data and the point-cloud map, respectively. The current linear transformation is a shared secret, or is derivable from a shared secret. The shared secret is available to the group of mobile communications devices.

According to a sixth aspect of the invention, a method for supporting localization and mapping by a group of mobile communications devices is provided. The method is performed by a trusted server and comprises receiving a current concealed representation of a point-cloud map from the map server, and deriving a subsequent concealed representation of the point-cloud map. The subsequent concealed representation is different from the current concealed representation. The method further comprises transmitting the subsequent concealed representation of the point-cloud map to the map server. The current concealed representation of the point-cloud map is derivable by applying a current linear transformation to the point-cloud map. The current linear transformation is a shared secret, or is derivable from a shared secret. The shared secret is available to the group of mobile communications devices.

According to a seventh aspect of the invention, a computer program is provided. The computer program comprises instructions which, when the computer program is executed by a processor comprised in a mobile communications device, cause the mobile communications device to carry out the method according to an embodiment of the fourth aspect of the invention.

According to an eight aspect of the invention, a computer program is provided. The computer program comprises instructions which, when the computer program is executed by a processor comprised in a map server, cause the map server to carry out the method according to an embodiment of the fifth aspect of the invention.

According to a ninth aspect of the invention, a computer program is provided. The computer program comprises instructions which, when the computer program is executed by a processor comprised in a trusted server, cause the trusted server to carry out the method according to an embodiment of the sixth aspect of the invention.

According to a tenth aspect of the invention, a computer-readable storage medium is provided. The computer-readable storage medium has stored thereon the computer program according to the seventh, eight, or ninth, aspect of the invention.

According to an eleventh aspect of the invention, a data carrier signal is provided. The data carrier signal carries the computer program according to the seventh, eight, or ninth, aspect of the invention.

The invention makes use of an understanding that the privacy of point-cloud maps which are stored in a map repository which is accessible by a third party, e.g., a provider of a cloud or edge storage service where the map repository is located, can be improved by concealing point-cloud maps by applying a linear transformation which preferably represents a substantial geometric distortion of the structural features represented by the point-cloud map. Thereby, the structural features which are represented by the point-cloud map become unrecognizable for standard object-recognition algorithms and analytics. As a consequence, analytics, object recognition, and targeted advertising, by a third party which has access to the map repository in which the concealed representations of point-cloud maps are stored is prevented, or at least hampered. Advantageously, concealing point-cloud maps in this way does not hamper collaborative mapping by merging point-cloud data which is received from one or more mobile communications devices. This is achieved by concealing point-cloud data, by applying the same linear transformation which is used for concealing the point-cloud map, before transmitting the concealed representations of point-cloud data to the map server, where they are merged with the concealed representation of the point-cloud map. The linear transformation serves as a key for concealing the point-cloud map and point-cloud data, respectively.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings and the appended claims. Those skilled in the art realize that different features of the invention can be combined to create embodiments other than those described in the following.

BRIEF DESCRIPTION OF THE DRAWINGS

The above, as well as additional objects, features and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

In the following, solutions for localization and mapping by a group of mobile communications devices, in particular collaborative mapping, are described. In the present context, the group of communications devices is assumed to be a "closed" group in the sense that all mobile communications devices which are members of the group have access to a point-cloud map which is stored on a map server which is not accessible by mobile communications devices which do not belong to the group. In other words, the mobile communications devices belonging to the group are "trusted". Each of the mobile communications devices may be any one of a smartphone, a mobile phone, a tablet, a laptop, a smartwatch, a Head-Mounted Display (HMD) device, an AR device, an MR device, an autonomous vehicle, and a drone.

Whereas different algorithms for localization and/or mapping are known in the art, it is assumed herein that the mobile communications devices utilize a SLAM algorithm in relation to point-cloud maps. Embodiments of the invention are, however, not limited to SLAM. It is further noted that point-cloud data which is obtained from mobile communications devices may be merged with an existing point-cloud map without performing localization and mapping. This may, e.g., be achieved by employing an Iterative Closest Point (ICP) algorithm known from the field of computer vision.

The map server is assumed to be untrusted, i.e., is not under exclusive control of the members of the group, e.g., a group administrator. Such a situation may arise if the map server storing the point-cloud map is provided as an edge or cloud service under control of a third party. The provider of the edge or cloud service may perform analytics or object recognition on the point-cloud map which may, e.g., be used for targeted advertising, which may not be desired by the members of the group.

Accessing the point-cloud map may involve retrieving, by the mobile communications devices of the group, at least parts of the map for the purpose of performing localization of the mobile communications devices in an environment which is represented by the map, as well as merging point-cloud data which has been derived by the mobile communications devices with the point-cloud map. The latter is also referred to as collaborative mapping and serves to improve, maintain, or update, the point-cloud map by utilizing sensor data which is captured by the mobile communications devices which are part of the group. Thereby, changes in the environment which is represented by the point-cloud map, e.g., if furniture in an indoor location is moved or replaced, can be reflected in the point-cloud map and thereby made available to the other mobile communications devices which are members of the group. In addition, a new mobile communications device which is equipped with sensor having improved or different sensing capabilities as compared to the sensors of the other mobile communications devices in the group may contribute with new, more accurate, or more detailed, structural information which can be merged with the existing point-cloud map.

As an example, the group may comprise all mobile communications devices of the members of a family who would like to share a common point-cloud map representing the family's home. As a further example, the group may comprise all mobile communications devices of the members of a workforce who would like to share a common point-cloud map representing a workplace, a construction site, or the like.

Figure 1:
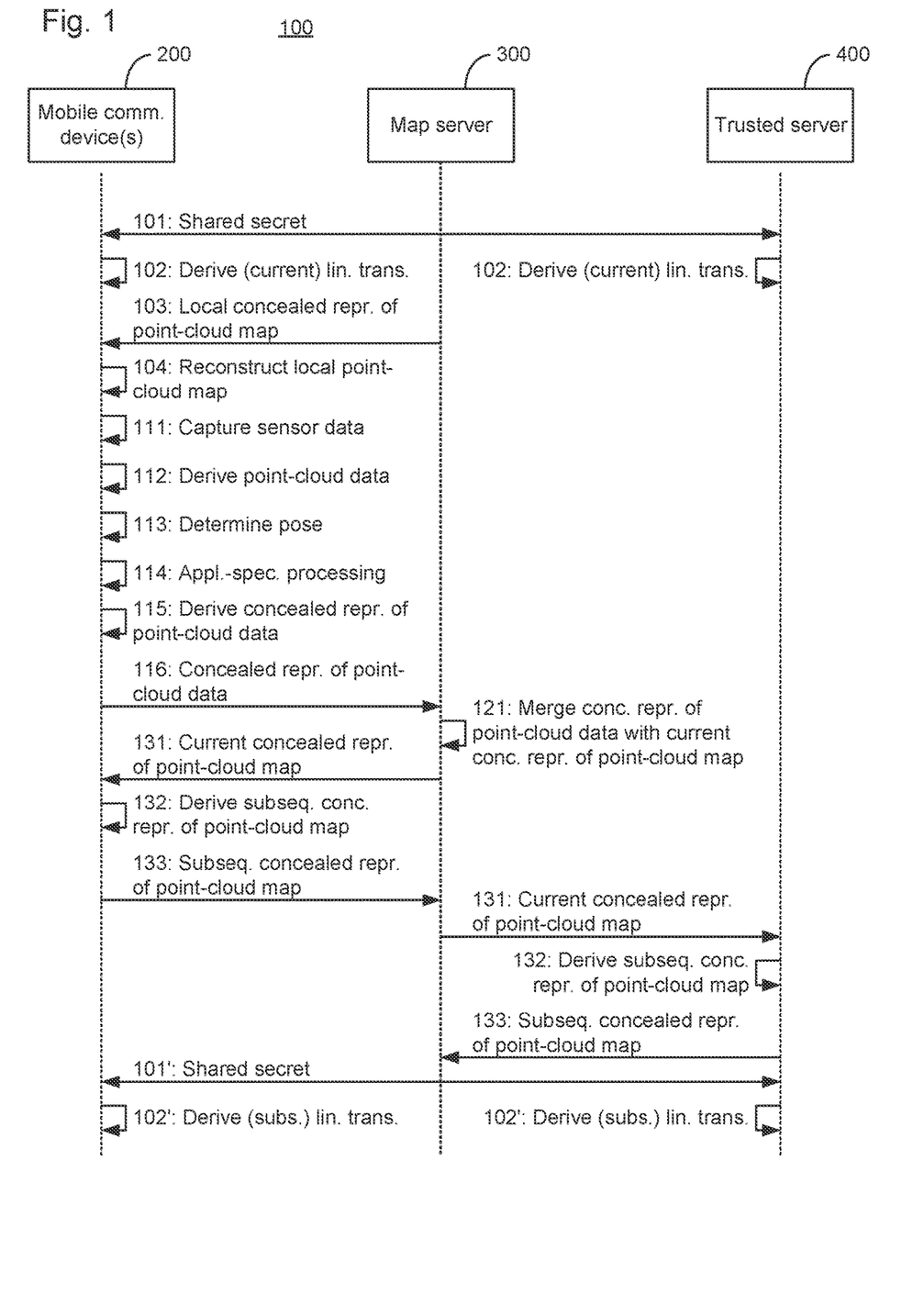
FIG. 1 shows a sequence diagram illustrating localization and mapping of a group of mobile communications devices, in accordance with embodiments of the invention.
Figure 2:
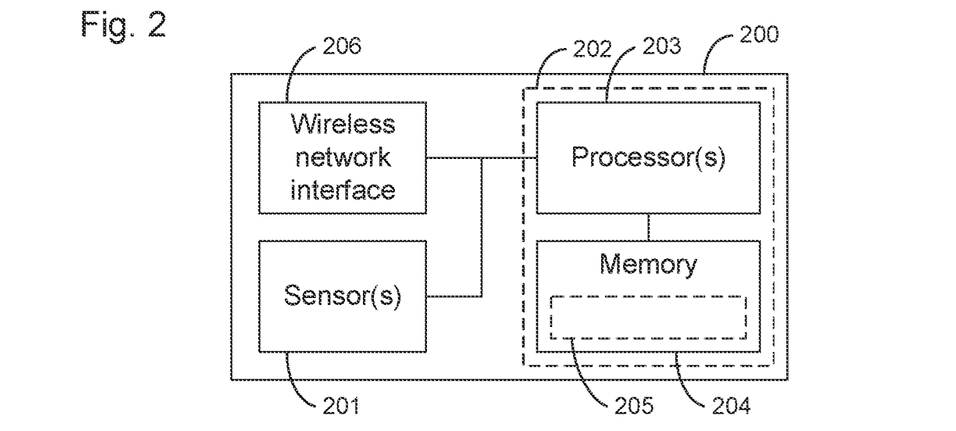
FIG. 2 schematically illustrates the mobile communications device for performing localization and mapping, in accordance with embodiments of the invention.
Figure 3:
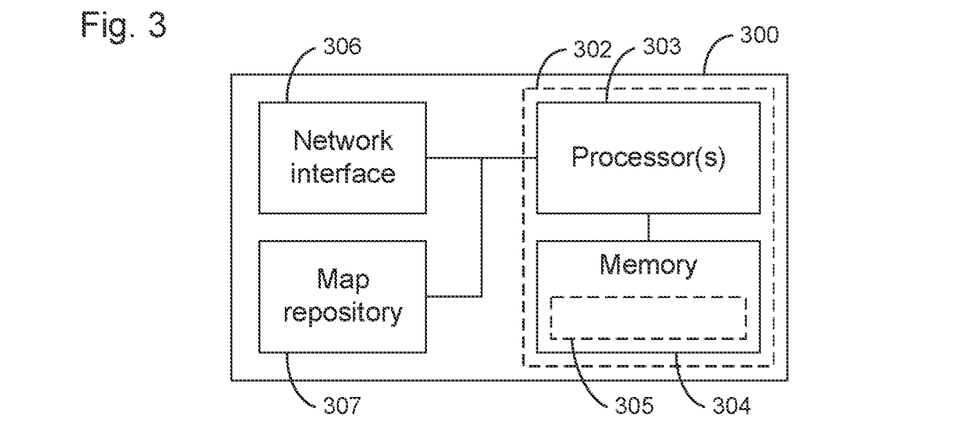
FIG. 3 schematically illustrates the map server for supporting localization and mapping by a group of mobile communications devices, in accordance with embodiments of the invention.
Figure 4:
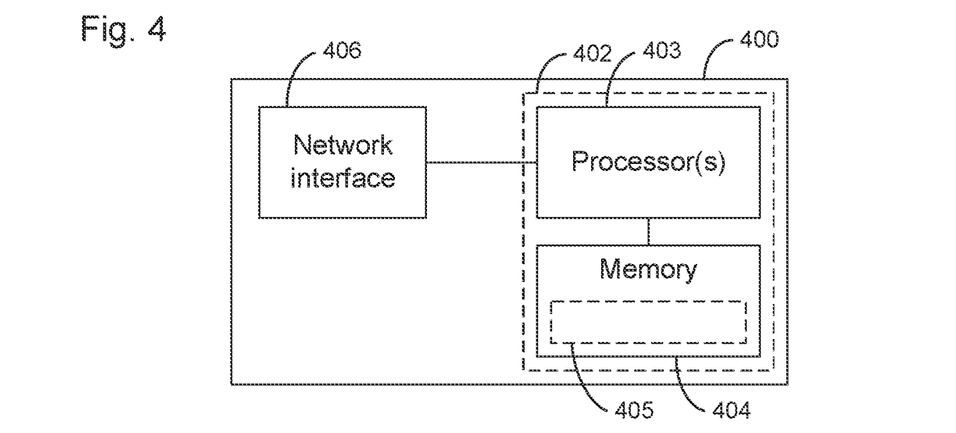
FIG. 4 schematically illustrates the trusted server for supporting localization and mapping by a group of mobile communications devices, in accordance with embodiments of the invention.

FIG. 1 shows a sequence diagram 100 illustrating localization and mapping of a group of mobile communications devices 200, in accordance with embodiments of the invention. Whereas only one mobile communications device 200 is illustrated in FIG. 1, for the sake of simplicity, embodiments of the invention involving more than mobile communications device 200 may easily be envisaged. Reference is also made to FIGS. 3 to 5, which schematically illustrate the mobile communications device 200 for performing localization and mapping, a map server 300 for supporting localization and mapping by a group of mobile communications devices 200, and a trusted server 400 for supporting localization and mapping by a group of mobile communications devices 200, respectively.

The mobile communications device 200 comprises at least one sensor 201 operative to capture sensor data of a local environment of the mobile communications device, and processing circuitry 202.

The at least one sensor 201 may comprise one or more of a monocular camera, a stereo depth camera, a LiDAR sensor, or any other type of sensor based on which structural information of the local environment can be derived. The local environment of a mobile communications device 200 is the space where the mobile communications device 200 is located, or through which the mobile communications device 200 moves. The size of the local environment is delimited by range of the at least one sensor 201, but may also be limited by an extend of mobility of the mobile communications device 200. Mobility may, e.g., be limited due to walls, doors, parts of a building with restricted access, and so forth. For instance, the local environment may be limited to one or more rooms, a corridor, a building, or the like.

The processing circuitry 202 causes the mobile communications device 200 to be operative to derive 112 point-cloud data d from the sensor data which is captured 111 by the at least one sensor 201. The derived point-cloud data represents structural features of the local environment, e.g., shapes and measures of objects or other structures which are present in the real-world space within the local environment. The mobile communications device 200 may be operative to derive point-cloud data from the captured sensor data in different ways. For instance, the point-cloud data may be obtained from the sensor 201 itself, if the sensor 201 is a 3D sensor, e.g., a stereo camera or a 3D LiDAR. Such sensors are readily available, e.g., the Intel RealSense D435i camera or the Intel RealSense L515 LiDAR Camera. Alternatively, point-cloud data may also be derived from 2D sensors, such as monocular cameras, either through photogrammetry techniques (e.g., Structure from Motion or Multi View Stereo), which usually are performed offline rather than online or in real-time, or by relying on SLAM. In the latter case, the map which the SLAM algorithm is constructing is already a point cloud, typically a sparse point cloud, as is the case for the ORB-SLAM algorithm which is an example for a SLAM algorithm.

The mobile communications device 200 is preferably further operative to determine 113 a pose of the mobile communications device 200 relative to a point-cloud map M which represents the local environment. The pose of a mobile communications device 200 describes the device's position and orientation in the 3D space which is represented by the map. In other words, the map defines the global coordinate system of the 3D space, and the pose of the mobile communications device 200 is expressed relative to that global coordinate system. A point cloud is a set of data points in space, and may be used as a digital representation of a 3D map.

Optionally, the mobile communications device 200 may further be operative to utilize the determined pose in any application-specific processing 114. For instance, the determined pose may serve as input to an application which is executed by the mobile communications device 200, e.g., an AR/MR application, an autonomous-driving application, etc.

Both the point-cloud data d and the point-cloud map M are sets of points, i.e., coordinates, in 3D space.

The mobile communications device 200 is further operative to derive 115 a concealed representation $d_n^*$ of the point-cloud data d. This is achieved by applying a current linear transformation $T_n$ to the point-cloud data d, i.e., $d_n^* = T_n \cdot d$. Applying a linear transformation to the point-cloud data amounts to a change of basis of the coordinate system of the point-cloud data. A linear transformation may be represented by a linear transformation matrix, which is a 3×3 matrix. If the linear transformation is carefully chosen, as is elucidated further below, this results in a substantial change of the structural information which is represented by the point-cloud data, so as to hamper analytics and object recognition. Accordingly, point-cloud data which has undergone a linear transformation in accordance with embodiments of the invention is referred to as "concealed" point-cloud data. Correspondingly, a point-cloud map which has undergone a linear transformation in accordance with embodiments of the invention is referred to as a "concealed" point-cloud map. The current linear transformation is the "key" which is used for concealing the point-cloud data or map.

The current linear transformation $T_n$ is a shared secret, or is derivable from a shared secret. The shared secret is available to the (closed) group of (trusted) mobile communications devices comprising the mobile communications device 200. In the present context, the group of mobile communications devices comprises all mobile communications devices 200 which have been provided with the shared secret. By virtue of the shared secret, they are able to utilize the current concealed representation $M_n^*$ of the point-cloud map M which is maintained by the map server 300 for localization, and contribute concealed representations $d_n^*$ of point-cloud data for collaborative mapping, by merging the concealed point-cloud data at the map server 300, as is described further below. Admission to the group admission and provisioning of the shared secret may be under control of a user of a trusted mobile communications device or group administrator.

The provisioning and/or distribution of the shared secret can either be performed by one of the mobile communications devices 200 of the group, or the trusted server 400. More specifically, the mobile communications device 200 may be operative to receive the shared secret from another (trusted) mobile communications device of the group of mobile communications devices (not illustrated in FIG. 1), or to receive 101 the shared secret from the trusted server 400, which is described further below. The trusted secret may be acquired by the other mobile communications device, or by the trusted server 400, and distributed to all the mobile communications devices belonging to the group. Alternatively, the mobile communications device 200 may be operative to acquire the shared secret, to transmit the shared secret to other mobile communications devices of the group of mobile communications devices (not illustrated in FIG. 1), and/or to transmit 101 the shared secret to the trusted server 400.

The trusted server 400 is associated with the (closed) group of the (trusted) mobile communications devices and may be under control of one of the users of the mobile communications devices of the group, or a group administrator. The trusted server 400 comprises processing circuitry 402 which may cause the trusted server 400 to be operative to receive 101 the shared secret from a mobile communications device 200 of the group of mobile communications devices. Alternatively, the trusted server 400 may be operative to acquire the shared secret, and to transmit 101 the shared secret to the mobile communications devices 200 of the group of mobile communications devices.

The provisioning of shared secrets within a (closed) group of (trusted) mobile communications devices and servers is known in the art, and not described here in detail. As an example, the shared secret may be manually configured by a user of one of the mobile communications devices of the group, or by a group administrator, or derived using a hash function or a random number generator. Preferably, the shared secret is such that the derived current or next linear transformation represents a substantial geometric distortion of the structural features, as is described further below.

The mobile communications device 200 is further operative to transmit 116 the concealed representation $d_n^*$ of the point-cloud data to the map server 300. The map server 300 is assumed to be an untrusted server, e.g., of an edge or cloud environment, for storing point-cloud maps which can be retrieved by the mobile communications devices 200. The concealed representation of the point-cloud data is transmitted 116 to the map server 300 for merging 121 of the concealed representation $d_n^*$ of the point-cloud data with a current concealed representation $M_n^*$ of a point-cloud map.

The map server 300 comprises processing circuitry 302 which causes the map server 300 to be operative to receive 116 concealed representations of point-cloud data from one or more mobile communications devices 200 of the group of mobile communications devices. The map server 300 is further operative to merge 121 the received concealed representations of point-cloud data $d_n^*$ with a current concealed representation $M_n^*$ of a point-cloud map representing local environments of the one or more mobile communications devices 200. The current concealed representation of the point-cloud map is stored in a map repository accessible by the map server 300, either in a map repository 307 comprised in the map server 300, or in an external map repository. In analogy to what is described above, the concealed representations $d_n^*$ of point-cloud data and the current concealed representation $M_n^*$ of the point-cloud map are derivable by applying the current linear transformation $T_n$ to the point-cloud data d and the point-cloud map M, i.e., $d_n^* = T_n \cdot d$ and $M_n^* = T_n \cdot M$, respectively.

The current linear transformation $T_n$ may be the shared secret which is available to the group of mobile communications devices 200, and optionally to the trusted sever 400, as is described hereinbefore. Alternatively, the current linear transformation $T_n$ may be derivable from the shared secret.

By merging 121 concealed representations $d_n^*$ of point-cloud data which is received 116 from multiple mobile communications devices 200 with the concealed representation $M_n^*$ of the point-cloud map, the concealed representation $M_n^*$ of the point-cloud map representing the local environments of the mobile communications devices 200 can be continuously updated in a collaborative manner.

Concealing the point-cloud map which is stored at the map server 300, and concealing the point-cloud data which is transmitted from the mobile communications devices 200 to the map server 300 for merging with the current concealed representation of the point-cloud map, by applying the same linear transformation to the point-cloud data and the point-cloud map, is advantageous in that merging of the (concealed) transformed point-cloud data with the (concealed) transformed point-cloud map is not prevented, as is the case with conventional solutions relying on encryption of point-cloud maps, owing to the known properties of linear transformations.

An important property of a linear transformation is that its inverse exists and is also linear. Accordingly, the point-cloud map M representing the local environment can be reconstructed from the current concealed representation $M_n^*$ of the point-cloud map by applying the inverse $T_n^{-1}$ of the current linear transformation to the current concealed representation $M_n^*$ of the point-cloud map, i.e., $M = T_n^{-1} \cdot M_n^*$. Similarly, point-cloud data d can be reconstructed from a concealed representation $d_n^*$ of point-cloud data by applying the inverse $T_n^{-1}$ of the current linear transformation to the concealed representation $d_n^*$ of the point-cloud data, $d = T_n^{-1} \cdot d_n^*$.

Preferably, the current linear transformation represents any one, or a combination of stretching, squeezing, and shearing, of the structural features. Further preferably, the current linear transformation represents a substantial geometric distortion of the structural features represented by point-cloud data or a point-cloud map. In the present context, a linear transformation represents a substantial geometric distortion of the structural features represented by point-cloud data or a point-cloud map if the structural features which are represented by point-cloud data or a point-cloud map become unrecognizable for standard object-recognition algorithms and analytics. Thereby, analytics, object recognition, and targeted advertising, by a third party which has access to the map repository in which the concealed representations of point-cloud maps are stored is prevented, or at least hampered.

In practice, it is possible to determine whether a linear transformation represents a substantial geometric distortion of the structural features represented by point-cloud data or a point-cloud map in a trial-and-error fashion. For instance, one may iteratively evaluate a concealed point-cloud map representing known structural features, e.g., known objects through, by applying standard object-recognition algorithms to verify whether the known objects are detected or not. If the known objects are not detected, the linear transformation may be used for concealing point-cloud data and point-cloud maps in accordance with embodiments of the invention.

As an example, a linear transformation representing stretching of structural features may be characterized by applying a substantially different scaling of at least one of the three axes, or basis vectors, of the coordinate system in which the points of point-cloud data or the point-cloud map are expressed, as compared to the other axes or basis vectors. For instance, one of the axes or basis vectors may be scaled by a factor of 1000, whereas the other two axes or basis vectors are maintained, which can be represented by the following linear transformation matrix:

$$T = \begin{pmatrix} 1 & 0 & 0 \\ 0 & 1 & 0 \\ 0 & 0 & 1000 \end{pmatrix}.$$

Similarly, a linear transformation representing squeezing of structural features may be characterized by applying a substantially different scaling of at least one of the three axes or basis vectors as compared to the other axes or basis vectors. For instance, one of the axes or basis vectors may be scaled by a factor of $1/1000$, whereas the other two axes or basis vectors are maintained:

$$T = \begin{pmatrix} 1 & 0 & 0 \\ 0 & 1 & 0 \\ 0 & 0 & 1/1000 \end{pmatrix}.$$

More generally, the linear transformations of stretching and squeezing can be expressed by the following linear transformation matrix representing a scaling transformation with scaling factors $sc_x$, $sc_y$, $sc_z$ (for simplicity, a cartesian coordinate system is assumed):

$$T = \begin{pmatrix} sc_x & 0 & 0 \\ 0 & sc_y & 0 \\ 0 & 0 & sc_z \end{pmatrix},$$

where $sc_i \gg sc_j$, with $i \neq j$ and $i,j \in \{x,y,z\}$ for at least one i.

As yet a further example, a linear transformation representing shearing of structural features may be characterized by displacing each point in a fixed direction, by an amount which is proportional to its distance from the line that is parallel to that direction and passes through the origin of the coordinate system. The following linear transformation illustrates shearing with a shearing factor of 1000:

$$T = \begin{pmatrix} 1 & 0 & 1000 \\ 0 & 1 & 0 \\ 0 & 0 & 1 \end{pmatrix}.$$

More generally, a linear shearing transformation can be expressed by the following linear transformation matrix, in which the $sh_i^j$, with $i \neq j$ and $i,j \in \{x,y,z\}$, are shearing factors, and $sh_i^j \gg 1$ for at least one i:

$$T = \begin{pmatrix} 1 & sh_x^y & sh_x^z \\ sh_y^x & 1 & sh_y^z \\ sh_z^x & sh_z^y & 1 \end{pmatrix}.$$

It will be appreciated that embodiments of the invention are not limited to the specific examples of stretching, squeezing, and shearing, transformations described hereinbefore. Rather, embodiments of the invention may rely on any linear transformation which represents a substantial geometric distortion of the structural features represented by point-cloud data or a point-cloud map, such that the structural features which are represented by point-cloud data or a point-cloud map become unrecognizable for standard object-recognition algorithms and analytics. It will also be appreciated that the current or linear transformation may be constructed as a sum of one or more linear transformation representing stretching, squeezing, and shearing, respectively.

The current linear transformation $T_n$ may be a combined transformation of a sequence of incremental linear transformations, i.e., $T_n = t_n \cdot t_{n-1} \ldots t_0$, where the $t_i$, $i=0 \ldots n$, are linear transformations. The incremental linear transformations are applied consecutively, starting with $t_0$, to obtain a combined (the current or a subsequent) linear transformation. A known property of linear transformation is that a product of linear transformations is also linear. In this case, the shared secret may be subsequent incremental linear transformation $t_{n+1}$, or the latter may be derived from the shared secret, and the mobile communications device 200 is further operative to derive a subsequent linear transformation $T_{n+1}$ by applying the subsequent incremental linear transformation $t_{n+1}$ to the current linear transformation $T_n$, i.e., $T_{n+1} = t_{n+1} \cdot T_n$. The thereby derived (subsequent) linear transformation $T_{n+1}$ becomes the current linear transformation which is used for deriving concealed representations of point-cloud data, deriving concealed representations of point-cloud maps, and reconstructing point-cloud maps from concealed representations of point-cloud maps, after all mobile communications devices 200 in the group, and optionally the trusted server 400, have derived the subsequent linear transformation $T_{n+1}$. The linear transformation $T_{n+1}$ is used as key for concealing point-cloud data and point-cloud maps until a subsequent new shared secret is provisioned and the process of deriving a subsequent linear transformation starts over.

Deriving the subsequent linear transformation from a sequence of incremental linear transformations is advantageous in that an adversary which has not in possession of the entire sequence of incremental linear transformations is not able to derive the subsequent linear transformation.

As an alternative to deriving the (current or subsequent) linear transformation as a combined transformation of incremental linear transformations, the new shared secret may also replace the current linear transformation, or the latter may be derived from the new shared secret.

The shared secret me be updated occasionally, regularly, or periodically, by provisioning a new shared secret among the group of mobile communications devices 200, and optionally the trusted sever 400. This is illustrated in the sequence diagram 100 of FIG. 1, which starts with provisioning 101 of a shared secret, from the which the (current) linear transformation is derived 102, and which is used as key for concealing point-cloud data and point-cloud maps until a new shared secret is provisioned 101' and the (subsequent) linear transformation is derived 102'.

For instance, a new shared secret may be provisioned 101/101' every hour, every day, every week, every month, or according to any suitable regular or irregular schedule. A new shared secret may also be provisioned 101/101' if a new mobile communications device joins or leaves the group, or if the environments in which the group of mobile communications devices operates changes. This may, e.g., be the case if a workforce is assigned to a new workplace, such as a construction site.

After the mobile communications devices 200 of the group, and optionally the trusted server 400, have derived 102' the subsequent linear transformation $T_{n+1}$, the subsequent linear transformation is used as current linear transformation in deriving concealed representations of point-cloud data by the mobile communications devices 200. In order for the map server 300 to be able to merge 121 concealed representations $d_{n+1}^*$ of point-cloud data, which are transmitted 116 from the mobile communications devices 200 to the map server 300, with the concealed representation of the point-cloud map $M_{n+1}^*$ which is maintained by the map server 300, the current concealed representation of a point-cloud needs to be concealed with the same linear transformation $T_{n+1}$ which is used by the mobile communications devices 200 for deriving 115 concealed representations $d_{n+1}^*$ of point-cloud data. Since the map server 300 is untrusted, i.e., has not access to the shared secret or the current linear transformation which is available to the (closed) group of the (trusted) mobile communications devices 200, and optionally the trusted server 400, it is envisaged that a subsequent concealed representation $M_{n+1}^*$ of the point-cloud map is performed by one of the mobile communications devices 200 of the group, or the trusted server 400, as is described in the following.

The map server 300 may be operative to transmit 131 the current concealed representation $M_n^*$ of the point-cloud map to a mobile communications device 200 of the group of mobile communications devices, or to the trusted server 400, and to receive 133 a subsequent concealed representation $M_{n+1}^*$ of the point-cloud map from the mobile communications device 200, or from the trusted server 400, respectively. The subsequent concealed representation $M_{n+1}^*$ is different from the current concealed representation $M_n^*$ but represents the same (reconstructed) point-cloud map M.

Correspondingly, the mobile communications device 200 may be operative to receive 131 the current concealed representation $M_n^*$ of the point-cloud map from the map server 300, derive 132 the subsequent concealed representation $M_{n+1}^*$ of the point-cloud map from the current concealed representation $M_n^*$ of the point-cloud map, and transmit 133 the subsequent concealed representation $M_{n+1}^*$ of the point-cloud map to the map server 300. The mobile communications device 200 may be operative to derive 132 the subsequent concealed representation $M_{n+1}^*$ of the point-cloud map by applying a subsequent incremental linear transformation $t_{n+1}$, which may have been provisioned 101' as the shared secret, to the current concealed representation $M_n^*$ of the point-cloud map, i.e., $M_{n+1}^* = t_{n+1} \cdot M_n^*$.

As an alternative, the mobile communications device 200 may be operative to derive 132 the subsequent concealed representation $M_{n+1}^*$ of the point-cloud map by applying the inverse $T_n^{-1}$ of the current linear transformation to the current concealed representation $M_n^*$ of the point-cloud map, to reconstruct the point-cloud map M, and then apply the derived 102' subsequent linear transformation $T_{n+1}$ to the reconstructed point-cloud map, i.e., $M_{n+1}^* = T_{n+1} \cdot (T_n^{-1} \cdot M^*)$.

The trusted server 400 may correspondingly be operative to receive 131 a current concealed representation $M_n^*$ of a point-cloud map from the map server 300, to derive 132 the subsequent concealed representation $M_{n+1}^*$ of the point-cloud map, and to transmit 133 the subsequent concealed representation $M_{n+1}^*$ of the point-cloud map to the map server 300. Similar to what is described above, the current concealed representation $M_n^*$ of the point-cloud map is derivable by applying a current linear transformation $T_n$ to the point-cloud map M, and the current linear transformation is a shared secret, or is derivable from a shared secret, which shared secret is available to the group of mobile communications devices 200. The current linear transformation $T_n$ may be a combined transformation of a sequence of incremental linear transformations $t_i$. In this case the trusted server 400 may be operative to derive 132 the subsequent concealed representation $M_{n+1}^*$ of the point-cloud map by applying a subsequent incremental linear transformation $t_{n+1}$, which may have been provisioned 101' as the shared secret, to the current concealed representation $M_n^*$ of the point-cloud map, i.e., $M_{n+1}^* = t_{n+1} \cdot M_n^*$.

As an alternative, the trusted server 400 may be operative to derive 132 the subsequent concealed representation $M_{n+1}^*$ of the point-cloud map by applying the inverse $T_n^{-1}$ of the current linear transformation to the current concealed representation $M_n^*$ of the point-cloud map, to reconstruct the point-cloud map P, and then apply the derived 102' subsequent linear transformation $T_{n+1}$ to the reconstructed point-cloud map, i.e., $M_{n+1}^* = T_{n+1} \cdot (T_n^{-1} \cdot M_n^*)$.

The mobile communications device 200 may further be operative to acquire 103 a current concealed representation $M_n^*$ of the point-cloud map representing the local environment of the mobile communications device 200 from the map server 300, and to reconstruct 104 the point-cloud map representing the local environment from the current concealed representation of the point-cloud map. This may be achieved by applying the inverse $T_n^{-1}$ of the current linear transformation to the current concealed representation $M_n^*$ of the point-cloud map M.

Preferably, the mobile communications device 200 may be operative to request, and receive 103, a concealed representation of the point-cloud map which represents its current local environment, i.e., a local concealed representation of the point-cloud map. The received 103 local concealed representation of the point-cloud map may be a subset of the current concealed representation of the point-cloud map stored at the map server 300. Thereby, the mobile communications device 200 may acquire 103 a local map from the map server 300 which represents a sufficiently large space of the current local environment of the mobile communications device 200 for performing location and/or mapping. Advantageously, embodiments of the invention allow to extract a local concealed representation of the point-cloud map from the concealed representation of the point-cloud map simply as a subset of the points comprised in the point-cloud map, without reconstructing the original point-cloud map. Solutions which rely on encrypted point-cloud maps do not allow extracting a local map as a subset without knowledge of the encryption key.

For instance, the mobile communications device 200 may request the local concealed representation of the point-cloud map based on its current position or location, which it may determine using a location sensor which is comprised in the mobile communications device 200 (not shown in FIG. 2). Such a location sensor may, e.g., be based on the Global Positioning System (GPS), the Global Navigation Satellite System (GNSS), China's BeiDou Navigation Satellite System (BDS), GLONASS, or Galileo, or may receive location information via the wireless network interface 206, e.g., from a location-information server (not illustrated in the Figures). The current location or position may, e.g., be determined based on radio triangulation, radio fingerprinting, or crowd-sourced identifiers which are associated with known locations of access points of wireless communications networks (e.g., cell-IDs or WLAN SSIDs). Alternatively, the current location or position may also be determined based on a beacon which is received via the wireless network interface 206, e.g., a beacon which is transmitted inside a confined area such as a business location, a workspace a factory, an office space, a family home, or the like.

If the mobile communications device 200 changes location or position, a new local concealed representation of a point-cloud map may be acquired which represents the new current local environment of the mobile communications device 200.

Correspondingly, the map server 300 may be operative to transmit 103 a local concealed representation of the point-cloud map to a mobile communications device 200 of the group of mobile communications devices, the local concealed representation of the point-cloud map representing the local environment of the mobile communications device 200, as is described hereinbefore. The map server 300 may be operative to transmit 103 the local concealed representation of the point-cloud map in response to receiving a request for a local map from the mobile communications device 200. Alternatively, the map server 300 may be operative to receive regular or occasional location or position updates from the mobile communications device 200 and transmit 103 a local concealed representation of the point-cloud map to the mobile communications device 200, which local concealed representation of the point-cloud map represent a sufficiently large space of the current local environment of the mobile communications device 200 for performing location and/or mapping.

The embodiments of the invention which are described hereinbefore rely on concealing point-cloud data by the mobile communications device 200, before transmitting a concealed representation of the point-cloud data to the map server 300 for merging with a current concealed representation of a point-cloud map, for the purpose of collaborative mapping. One may also envisage alternative embodiments of the invention why rely on concealing point-cloud data by the trusted server 400 (not illustrated in the Figures). In this case, the trusted server 400 receives (unconcealed) point-cloud data from one or more mobile communications devices 200. Similar to what has been described with reference to FIG. 1, after concealing the point-cloud data by the trusted server 400, by applying a current linear transformation to the point-cloud data, the concealed representation of the point-cloud data is transmitted to the map server 300 for merging with a current concealed representation of a point-cloud map.

More specifically, the trusted server 400 is operative to receive point-cloud data d from one or more mobile communications devices 200, which point-cloud data represents structural features of local environments of the one or more mobile communications devices 200. The trusted server 400 is further operative to determine poses of the mobile communications devices 200 relative to a point-cloud map M representing the local environments, derive a concealed representation $d_n^*$ of the point-cloud data, and transmit the concealed representation of the point-cloud data to the map server 300. The concealed representation $d_n^*$ of the point-cloud data is derived by applying a current linear transformation $T_n$ to the point-cloud data, as is described hereinbefore. The concealed representation of the point-cloud data is transmitted to the map server 300 for merging of the concealed representation $d_n^*$ of the point-cloud data with the current concealed representation $M_n^*$ of the point-cloud map.

In the following, embodiments of the mobile communications device 200, the map server 300, and the trusted server 400, are described with reference to FIGS. 2 to 4.

With reference to FIG. 2, the mobile communications device further comprises a wireless network interface 206 for effecting communications with other mobile communications devices 200, the map server 300, the trusted server 400, and/or any other network nodes or communication networks. The wireless network interface 206 may comprise one or more of a cellular modem (e.g., GSM, UMTS, LTE, 5G, NR/NX), a WLAN/Wi-Fi modem, a Bluetooth modem, a Near-Field Communication (NFC) modem, or the like.

The processing circuitry 202 may comprise one or more processors 203, such as Central Processing Units (CPUs), microprocessors, application-specific processors, Graphics Processing Units (GPUs), and Digital Signal Processors (DSPs) including image processors, or a combination thereof, and a memory 204 comprising a computer program 205 comprising instructions. When executed by the processor(s) 203, the computer program 205 causes the mobile communications device 200 to be operative in accordance with embodiments of the invention described herein. The memory 204 may, e.g., be a Random-Access Memory (RAM), a Read-Only Memory (ROM), a Flash memory, or the like. The computer program 205 may be downloaded to the memory 204 by means of the wireless network interface 206, as a data carrier signal carrying the computer program 205.

The processing circuitry 202 may alternatively or additionally comprise one or more Application-Specific Integrated Circuits (ASICs), Field-Programmable Gate Arrays (FPGAs), or the like, which are operative to cause the mobile communications device 200 to be operative in accordance with embodiments of the invention described herein.

The mobile communications device 200 may comprise alternative or additional components, such as one or more displays, microphones, loudspeakers, wired communications interfaces, or the like (not illustrated in FIG. 2).

With reference to FIG. 3, the map server 300 further comprises a network interface 306 for effecting communications with the mobile communications devices 200, the trusted server 400, and/or any other network nodes or communication networks. The network interface 306 may implement any suitable wired or wireless communications technology, such as Ethernet, GSM, UMTS, LTE, 5G, NR/NX, WLAN/Wi-Fi, Bluetooth, NFC, or the like.

The processing circuitry 302 may comprise one or more processors 303, such as CPUs, microprocessors, application-specific processors, GPUs, and DSPs including image processors, or a combination thereof, and a memory 304 comprising a computer program 305 comprising instructions. When executed by the processor(s) 303, the computer program 305 causes the map server 300 to be operative in accordance with embodiments of the invention described herein. The memory 304 may, e.g., be a RAM, a ROM, a Flash memory, or the like. The computer program 305 may be downloaded to the memory 304 by means of the network interface 306, as a data carrier signal carrying the computer program 305. The map repository 307 may be part of the memory 304 or comprised in a separate memory or data storage.

The processing circuitry 302 may alternatively or additionally comprise one or more ASICs, FPGAs, or the like, which are operative to cause the map server 300 to be operative in accordance with embodiments of the invention described herein.

With reference to FIG. 4, the trusted server 400 further comprises a network interface 406 for effecting communications with the mobile communications devices 200, the map server 300, and/or any other network nodes or communication networks. The network interface 406 may implement any suitable wired or wireless communications technology, such as Ethernet, GSM, UMTS, LTE, 5G, NR/NX, WLAN/Wi-Fi, Bluetooth, NFC, or the like.

The processing circuitry 402 may comprise one or more processors 403, such as CPUs, microprocessors, application-specific processors, GPUs, and DSPs including image processors, or a combination thereof, and a memory 404 comprising a computer program 405 comprising instructions. When executed by the processor(s) 403, the computer program 405 causes the trusted server 400 to be operative in accordance with embodiments of the invention described herein. The memory 404 may, e.g., be a RAM, a ROM, a Flash memory, or the like. The computer program 405 may be downloaded to the memory 404 by means of the network interface 406, as a data carrier signal carrying the computer program 405.

The processing circuitry 402 may alternatively or additionally comprise one or more ASICs, FPGAs, or the like, which are operative to cause the trusted server 400 to be operative in accordance with embodiments of the invention described herein.

The exchange of information and data between the mobile communications devices 200, the map sever 300, the trusted server 400, and/or any other network nodes or communication networks, may be effected using one or more suitable protocols, e.g., the Hypertext Transfer Protocol (HTTP), the Transmission Control Protocol/Internet Protocol (TCP/IP) suite, the Constrained Application Protocol (CoAP), the User Datagram Protocol (UDP), or the like. The point-cloud data, the point-cloud maps, and concealed representations thereof, may be stored and transmitted using any suitable format, e.g., the Point Cloud Data (PCD) file format, the Polygon File Format (PLY), the STL file format (native to the stereolithography CAD software developed by 3D Systems), the geometry definition file format OBJ which was first developed by Wavefront Technologies, the ISO standard XML-based file format X3D for representing 3D computer graphics data, the LAS file format which is designed for the interchange and archiving of LiDAR point cloud data, and the like.

Figure 5:
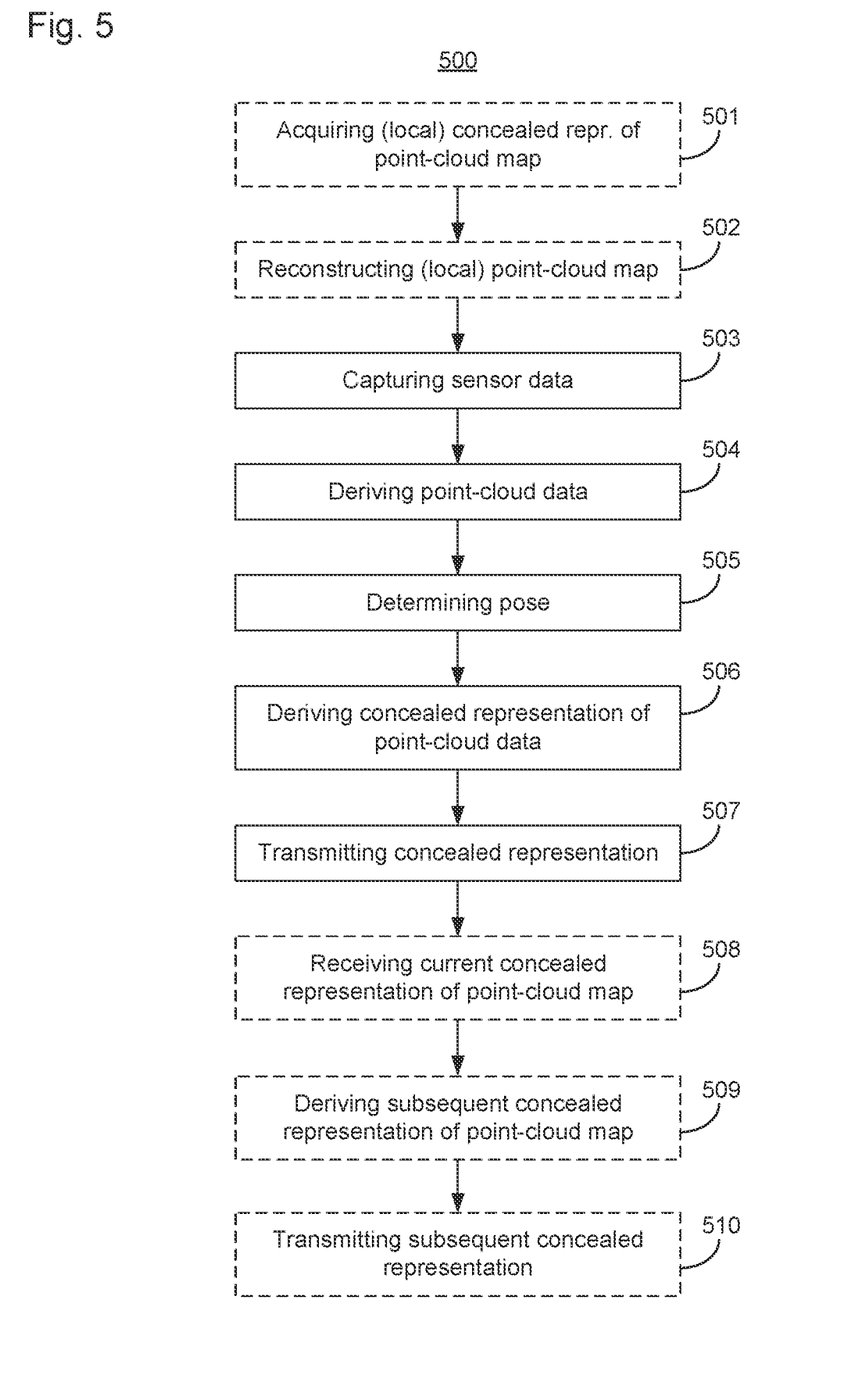
FIG. 5 shows a flow chart illustrating the method for performing localization and mapping, performed by a mobile communications device, in accordance with embodiments of the invention.

In the following, embodiments of the method for performing localization and mapping are described with reference to FIG. 5. The method 500 is performed by a mobile communications device 200 and comprises capturing 503 sensor data of a local environment of the mobile communications device, using at least one sensor comprised in the mobile communications device, deriving 504 point-cloud data from the sensor data, the derived point-cloud data representing structural features of the local environment, determining 505 a pose of the mobile communications device relative to a point-cloud map representing the local environment, deriving 506 a concealed representation of the point-cloud data, by applying a current linear transformation to the point-cloud data, and transmitting 507 the concealed representation of the point-cloud data to a map server. The at least one sensor may comprise one or more of a monocular camera, a stereo depth camera, and a LiDAR sensor. The current linear transformation is a shared secret, or is derivable from a shared secret, which shared secret is available to a group of mobile communications devices comprising the mobile communications device. The concealed representation of the point-cloud data is transmitted to the map server for merging of the concealed representation of the point-cloud data with a current concealed representation of a point-cloud map.

The current linear transformation may represent any one, or a combination of stretching, squeezing, and shearing, of the structural features.

Preferably, the current linear transformation represents a substantial geometric distortion of the structural features.

The current linear transformation may be a combined transformation of a sequence of incremental linear transformations, and the shared secret is a subsequent incremental linear transformation. The method 500 may further comprise deriving a subsequent linear transformation by applying the acquired subsequent incremental linear transformation to the current linear transformation.

The method 500 may further comprise receiving 508 a current concealed representation of the point-cloud map from the map server, deriving 509 a subsequent concealed representation of the point-cloud map from the current concealed representation of the point-cloud map, which subsequent concealed representation is different from the current concealed representation, and transmitting 510 the subsequent concealed representation of the point-cloud map to the map server. The subsequent concealed representation of the point-cloud map may be derived by applying a subsequent incremental linear transformation to the current concealed representation of the point-cloud map.

The method 500 may further comprise acquiring 501 a current concealed representation of the point-cloud map representing the local environment from the map server, and reconstructing 502 the point-cloud map representing the local environment from the current concealed representation of the point-cloud map, by applying an inverse of the current linear transformation to the current concealed representation of the point-cloud map.

It will be appreciated that the method 500 may comprise additional, alternative, or modified, steps in accordance with what is described throughout this disclosure. An embodiment of the method 500 may be implemented as the computer program 205 comprising instructions which, when executed by the one or more processor(s) 203 comprised in the mobile communications device 200, cause the mobile communications device 200 to be operative in accordance with embodiments of the invention described herein. The mobile communications device may be any one of a smartphone, a mobile phone, a tablet, a laptop, a smartwatch, a head-mounted display device, an AR device, an MR device, an autonomous vehicle, and a drone.

Figure 6:
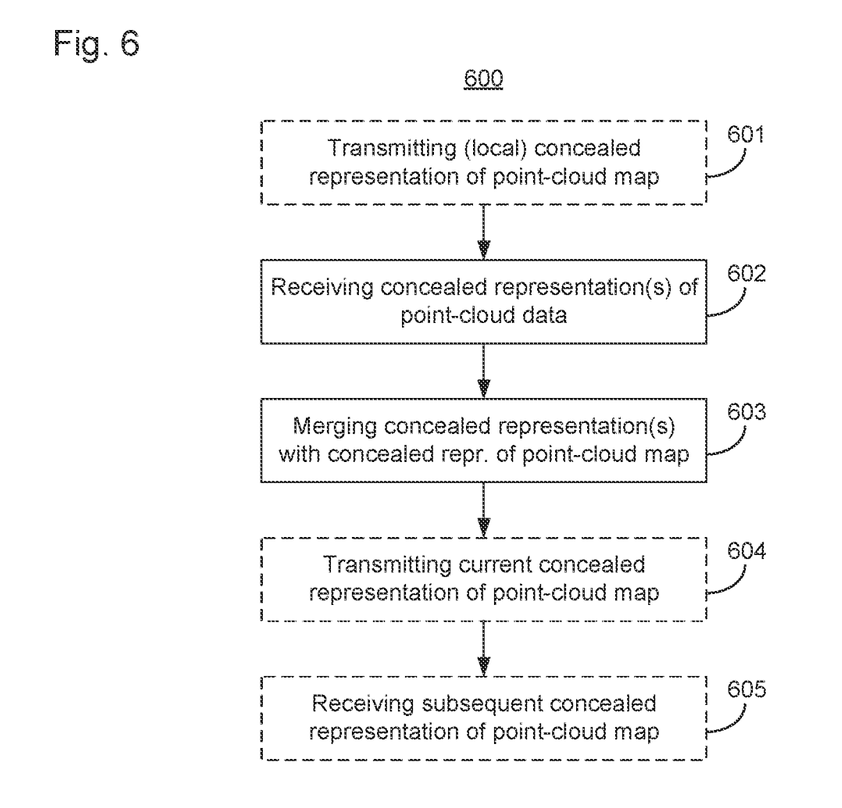
FIG. 6 shows a flow chart illustrating the method for supporting localization and mapping by a group of mobile communications devices, performed by a map server, in accordance with embodiments of the invention.

In the following, embodiments of the method for supporting localization and mapping by a group of mobile communications devices are described with reference to FIG. 6. The method 600 is performed by a map server 300 and comprises receiving 602 concealed representations of point-cloud data from one or more mobile communications devices of the group of mobile communications devices, and merging 603 the received concealed representations of point-cloud data with a current concealed representation of a point-cloud map representing local environments of the one or more mobile communications devices. The concealed representations of point-cloud data and the current concealed representation of a point-cloud map are derivable by applying a current linear transformation to the point-cloud data and the point-cloud map, respectively, and the current linear transformation is a shared secret, or is derivable from a shared secret, which shared secret is available to the group of mobile communications devices.

The method 600 may further comprise transmitting 604 the current concealed representation of the point-cloud map to a mobile communications device of the group of mobile communications devices, or to a trusted server, and receiving 605 a subsequent concealed representation of the point-cloud map from the mobile communications device, or from the trusted server. The subsequent concealed representation is different from the current concealed representation.

The method 500 may further comprise transmitting 601 a local current concealed representation of the point-cloud map to a mobile communications device of the group of mobile communications devices, the local current concealed representation of the point-cloud map representing the local environment of the mobile communications device.

It will be appreciated that the method 600 may comprise additional, alternative, or modified, steps in accordance with what is described throughout this disclosure. An embodiment of the method 600 may be implemented as the computer program 305 comprising instructions which, when executed by the one or more processor(s) 303 comprised in the map server 300, cause the map server 300 to be operative in accordance with embodiments of the invention described herein.

Figure 7:
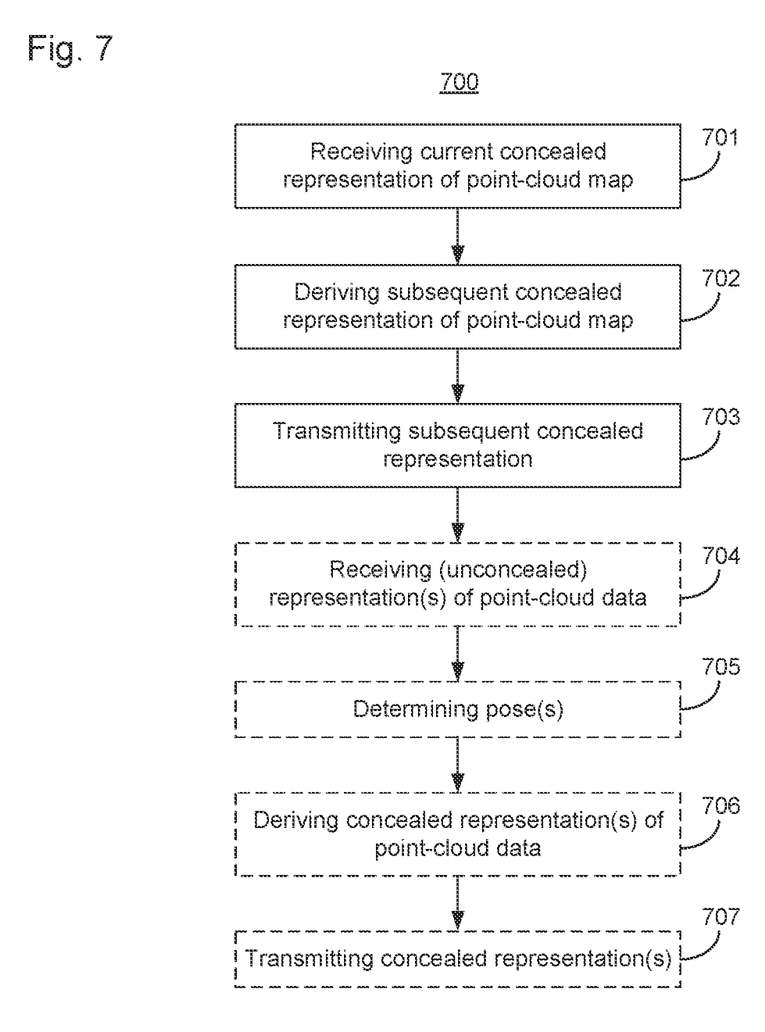
FIG. 7 shows a flow chart illustrating the method for supporting localization and mapping by a group of mobile communications devices, performed by a trusted server, in accordance with embodiments of the invention.

In the following, embodiments of the method for supporting localization and mapping by a group of mobile communications devices are described with reference to FIG. 7. The method 700 is performed by a trusted server 400 and comprises receiving 701 a current concealed representation of a point-cloud map from the map server, deriving 702 a subsequent concealed representation of the point-cloud map, which subsequent concealed representation is different from the current concealed representation, and transmitting 703 the subsequent concealed representation of the point-cloud map to the map server. The current concealed representation of the point-cloud map is derivable by applying a current linear transformation to the point-cloud map, and the current linear transformation is a shared secret, or is derivable from a shared secret, which shared secret is available to the group of mobile communications devices. The concealed representation of the point-cloud data is transmitted to the map server for merging of the concealed representation of the point-cloud data with the current concealed representation of the point-cloud map.

The current linear transformation may be a combined transformation of a sequence of incremental linear transformations, and the shared secret is a subsequent incremental linear transformation. The method 700 may further comprise deriving the subsequent concealed representation of the point-cloud map by applying the subsequent incremental linear transformation to the current concealed representation of the point-cloud map.

The method 700 may further comprise receiving 704 point-cloud data from one or more mobile communications devices, the point-cloud data representing structural features of local environments of the one or more mobile communications devices, determining 705 poses of the mobile communications devices relative to a point-cloud map representing the local environments, deriving 706 a concealed representation of the point-cloud data, by applying a current linear transformation to the point-cloud data, and transmitting 707 the concealed representation of the point-cloud data to the map server. The point-cloud data which is received from one or more mobile communications devices is unconcealed.

It will be appreciated that the method 700 may comprise additional, alternative, or modified, steps in accordance with what is described throughout this disclosure. An embodiment of the method 700 may be implemented as the computer program 405 comprising instructions which, when executed by the one or more processor(s) 403 comprised in the trusted server 400, cause the trusted server 400 to be operative in accordance with embodiments of the invention described herein.

The person skilled in the art realizes that the invention by no means is limited to the embodiments described above. On the contrary, many modifications and variations are possible within the scope of the appended claims.

The invention claimed is:

1. A mobile communications device for performing localization and mapping, the mobile communications device comprising:
   at least one sensor operative to capture sensor data of a local environment of the mobile communications device;
   processing circuitry coupled to the at least one sensor; and
   memory coupled to the processing circuitry and having instructions stored therein that are executable by the processing circuitry to cause the mobile communications device to perform operations comprising:
   deriving point-cloud data from the sensor data, the point-cloud data representing structural features of the local environment;
   determining a pose of the mobile communications device relative to a point-cloud map representing the local environment;
   deriving a concealed representation of the point-cloud data by applying a current linear transformation to the point-cloud data, the current linear transformation representing at least one of:
   stretching of the structural features;
   squeezing of the structural features; and
   shearing of the structural features; and
   transmitting the concealed representation of the point-cloud data to a map server.

2. The mobile communications device of claim 1, wherein the current linear transformation represents at least one of:
   squeezing of the structural features; and
   Shearing of the structural features.

3. The mobile communications device of claim 1, wherein the current linear transformation represents a substantial geometric distortion of the structural features.

4. The mobile communications device of claim 1, wherein the current linear transformation is a shared secret or is derivable from a shared secret, the shared secret being available to a group of mobile communications devices that includes the mobile communications device, and
   wherein the current linear transformation is a combined transformation of a sequence of incremental linear transformations, and the shared secret is a subsequent incremental linear transformation,
   the operations further comprising:
   deriving a subsequent linear transformation by applying the subsequent incremental linear transformation to the current linear transformation.

5. The mobile communications device of claim 1, the operations further comprising:
   receiving a current concealed representation of the point-cloud map from the map server;
   deriving a subsequent concealed representation of the point-cloud map from the current concealed representation of the point-cloud map, the subsequent concealed representation being different from the current concealed representation; and
   transmitting the subsequent concealed representation of the point-cloud map to the map server.

6. The mobile communications device of claim 5, wherein deriving the subsequent concealed representation of the point-cloud map comprises applying a subsequent incremental linear transformation to the current concealed representation of the point-cloud map.

7. The mobile communications device of claim 1, the operations further comprising:
   acquiring a current concealed representation of the point-cloud map representing the local environment from the map server; and
   reconstructing the point-cloud map representing the local environment from the current concealed representation of the point-cloud map by applying an inverse of the current linear transformation to the current concealed representation of the point-cloud map.

8. The mobile communications device of claim 1, wherein the concealed representation of the point-cloud data is transmitted to the map server for merging of the concealed representation of the point-cloud data with a current concealed representation of a point-cloud map.

9. The mobile communications device of claim 1, wherein the at least one sensor comprises at least one of:
a monocular camera;
a stereo depth camera; and
a light detection and ranging ("LiDAR") sensor.

10. The mobile communications device of claim 1, comprising at least one of:
a smartphone;
a mobile phone;
a tablet, a laptop;
a smartwatch;
a head-mounted display device;
an Augmented-Reality device;
a Mixed-Reality device;
an autonomous vehicle; and
a drone.

11. A map server for supporting localization and mapping by a group of mobile communications devices, the map server comprising:
processing circuitry; and
memory coupled to the processing circuitry and having instructions stored therein that are executable by the processing circuitry to cause the map server to perform operations comprising:
receiving concealed representations of point-cloud data from one or more mobile communications devices of the group of mobile communications devices, the point-cloud data representing structural features of a local environment of the one or more mobile communication devices; and
merging the concealed representations of the point-cloud data with a current concealed representation of a point-cloud map,
wherein the concealed representations of the point-cloud data and the current concealed representation of the point-cloud map are derivable by applying a current linear transformation to the point-cloud data and the point-cloud map, respectively, the current linear transformation representing at least one of:
stretching of the structural features;
squeezing of the structural features; and
shearing of the structural features.

12. The map server of claim 11, the operations further comprising:
transmitting the current concealed representation of the point-cloud map to a mobile communications device of the group of mobile communications devices, or to a trusted server, and
receiving a subsequent concealed representation of the point-cloud map from the mobile communications device, or from the trusted server, the subsequent concealed representation being different from the current concealed representation.

13. The map server of claim 11, the operations further comprising:
transmitting a local current concealed representation of the point-cloud map to a mobile communications device of the group of mobile communications devices.

14. A trusted server for supporting localization and mapping by a group of mobile communications devices, the trusted server comprising:
processing circuitry; and
memory coupled to the processing circuitry and having instructions stored therein that are executable by the processing circuitry to cause the map server to perform operations comprising:
receiving a current concealed representation of a point-cloud map from the map server, the point-cloud map representing structural features of a local environment of the group of mobile communications devices;
deriving a subsequent concealed representation of the point-cloud map, the subsequent concealed representation being different from the current concealed representation; and
transmitting the subsequent concealed representation of the point-cloud map to the map server,
wherein the current concealed representation of the point-cloud map is derivable by applying a current linear transformation to the point-cloud map, the current linear transformation representing at least one of:
stretching of the structural features;
squeezing of the structural features; and
shearing of the structural features.

15. The trusted server of claim 14, wherein the current linear transformation is a shared secret or is derivable from a shared secret, the shared secret being available to the group of mobile communications devices, and
wherein the current linear transformation is a combined transformation of a sequence of incremental linear transformations, and the shared secret is a subsequent incremental linear transformation,
wherein deriving the subsequent concealed representation of the point-cloud map comprises applying the subsequent incremental linear transformation to the current concealed representation of the point-cloud map.

16. The trusted server of claim 14, the operations further comprising:
receiving point-cloud data from one or more mobile communications devices, the point-cloud data representing structural features of local environments of the one or more mobile communications devices,
determining poses of the mobile communications devices relative to a point-cloud map representing the local environments,
deriving a concealed representation of the point-cloud data, by applying a current linear transformation to the point-cloud data, and
transmitting the concealed representation of the point-cloud data to the map server.

17. The trusted server of claim 16, wherein the concealed representation of the point-cloud data is transmitted to the map server for merging of the concealed representation of the point-cloud data with the current concealed representation of the point-cloud map.

18. A method of operating a mobile communications device to perform localization and mapping, the method comprising:
deriving point-cloud data from sensor data of a local environment of the mobile communications device, the point-cloud data representing structural features of the local environment;
determining a pose of the mobile communications device relative to a point-cloud map representing the local environment;

deriving a concealed representation of the point-cloud data, by applying a current linear transformation to the point-cloud data, the current linear transformation representing at least one of:
stretching of the structural features;
squeezing of the structural features; and
shearing of the structural features; and
transmitting the concealed representation of the point-cloud data to a map server.

19. The method of claim 18, wherein the current linear transformation is a shared secret or is derivable from a shared secret, the shared secret being available to the group of mobile communications devices, and
wherein the current linear transformation is a combined transformation of a sequence of incremental linear transformations, and the shared secret is a subsequent incremental linear transformation,
the method further comprising:
deriving a subsequent linear transformation by applying the acquired subsequent incremental linear transformation to the current linear transformation.

20. The method of claim 18, further comprising:
receiving a current concealed representation of the point-cloud map from the map server;
deriving a subsequent concealed representation of the point-cloud map from the current concealed representation of the point-cloud map, the subsequent concealed representation is different from the current concealed representation; and
transmitting the subsequent concealed representation of the point-cloud map to the map server.

* * * * *